United States Patent
Duggan et al.

(10) Patent No.: US 6,359,942 B1
(45) Date of Patent: Mar. 19, 2002

(54) FSK DEMODULATOR

(75) Inventors: Bernard C Duggan, Bristol; Christopher R Shepherd, Bassingham; Michael J Pearce, Swindon, all of (GB)

(73) Assignee: Mitel Semiconductor Limited (GB)

( * ) Notice: Subject to any disclaimer, the term of this patent is extended or adjusted under 35 U.S.C. 154(b) by 0 days.

(21) Appl. No.: 09/110,516

(22) Filed: Jul. 6, 1998

(30) Foreign Application Priority Data

Oct. 9, 1997 (GB) .............................................. 9721362

(51) Int. Cl.[7] .............................................. H03D 3/00
(52) U.S. Cl. ...................................... 375/335; 375/334
(58) Field of Search ............................... 375/335, 324, 375/334, 340, 350; 329/300, 303, 302

(56) References Cited

U.S. PATENT DOCUMENTS

| 5,081,650 A | * | 1/1992 | Hasegawa et al. | 375/324 |
| 5,612,976 A | * | 3/1997 | Granger-Jones | 375/322 |
| 5,724,001 A | * | 3/1998 | Chang | 329/302 |
| 5,799,043 A | * | 8/1998 | Chang et al. | 375/286 |
| 5,844,948 A | * | 12/1998 | Ben-Efraim et al. | 375/344 |
| 6,011,816 A | * | 1/2000 | Sanielevici et al. | 375/324 |
| 6,038,268 A | * | 3/2000 | Kawai | 375/334 |

* cited by examiner

Primary Examiner—Chi Pham
Assistant Examiner—Khai Tran
(74) Attorney, Agent, or Firm—Kirschstein, et al.

(57) ABSTRACT

A 4-level direct conversion receiver demodulator 1 comprises an edge detector 2, a finite impulse response filter 3, an N-bit path 4, a data slicer 5 and automatic frequency control device 6. The edge detector 2 receives Limited I (LIMI) and Limited Q (LIMQ) signals on respective ones of first and second input leads 7 and 8 from a direct conversion receiver arrangement R. The edge detector 2 contains logic to provide an EDGE signal, comprising a short pulse when any edge is detected in either of the LIMI and LIMQ signals, on a line 9 and an I Lead Q (ILQ) signal, indicative of which of the LIMI and LIMQ signals has the leading phase, on a line 10 to the filter 3. The edge detector 2 thus determines both the frequency and the relative phase of the signals provided by the limited output direct conversion receiver R without the use of analogue to digital conversion circuitry. The N-bit path output 4 from the filter 3 is provided to both the data slicer 5 and to the AFC device 6. A demodulated output signal is provided in the form of an MSB and an LSB on respective ones of demodulator outputs 11 and 12.

3 Claims, 3 Drawing Sheets

FSK DEMODULATOR

The present invention relates to a frequency shift key (FSK) demodulator and particularly, although not exclusively, to an FSK demodulator for a direct conversion paging receiver.

Paging receivers have used a double conversion superheterodyne architecture, but such receivers usually require first and second stage image filters, as well as ceramic filters for use in their channel filter and frequency discriminator circuits. These requirements can make such receivers both expensive and bulky.

Limited output direct conversion receivers, on the other hand, do not require these filters, nor do they require large dynamic range automatic gain control circuits. However, to faithfully demodulate four-level frequency shift keyed signals, it has been necessary to provide these receivers with multibit analogue to digital converters and complex and expensive demodulation circuitry.

In accordance with one aspect of the present invention, an FSK demodulator, for demodulating I and Q output signals provided by a direct conversion receiver arrangement comprises means responsive to said I and Q signals to provide a first signal dependent on the frequency of said I and Q signals and a second signal dependent on the relative phase of said I and Q signals, and a finite impulse response filter means arranged to receive said first and second signals and to provide an output signal representative of data carried by said I and Q signals.

In accordance with another aspect of the present invention there is provided a demodulator arrangement for a direct conversion receiver responsive to four-level frequency-shift keyed received signals to provide phase-quadrature I and Q signals, the demodulator arrangement comprising means to provide a pulse output signal in response to each transition between levels in said I and Q signals, means to provide a phase output signal indicative of the relative phase of said I and Q signals, a finite impulse response filter responsive to said pulse output signals and said phase output signals to provide a pulse-rate signal indicative of the frequency of said I and Q signals, and decoder means responsive to said pulse-rate signal and to said phase output signal to provide demodulated output signals.

An embodiment of the present invention will now be described with reference to the accompanying drawings, of which:

Figure 1:
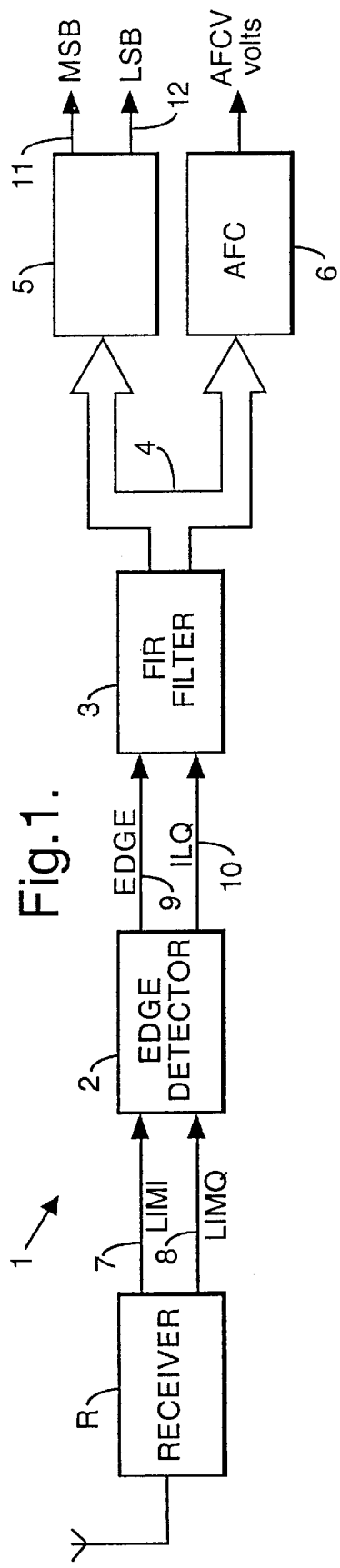
FIG. 1 shows in block diagram form a demodulator in accordance with the present invention.

Referring first to FIG. 1, the direct conversion receiver demodulator 1 comprises an edge detector 2, a finite impulse response (FIR) filter 3, an N-bit path 4, a data slicer 5 and automatic frequency control (AFC) device 6.

The edge detector 2 receives Limited I (LIMI) and Limited Q (LIMQ) signals from respective ones of first and second input leads 7 and 8, provided by a direct conversion receiver arrangement R, which may for example be an SL6689-1 receiver IC as manufactured by Plessey Semiconductors Limited, although any such receiver providing limited I and Q output signals could be used. The edge detector 2 provides an EDGE signal on a line 9 and an I Lead Q (ILQ) signal on a line 10 to the filter 3.

The N-bit path output 4 from the filter 3 is provided to both the data slicer 5 and to the AFC device 6. A demodulated output signal is provided in the form of a Most Significant Bit (MSB) and a Least Significant Bit (LSB) on respective ones of demodulator outputs 11 and 12.

Figure 2:
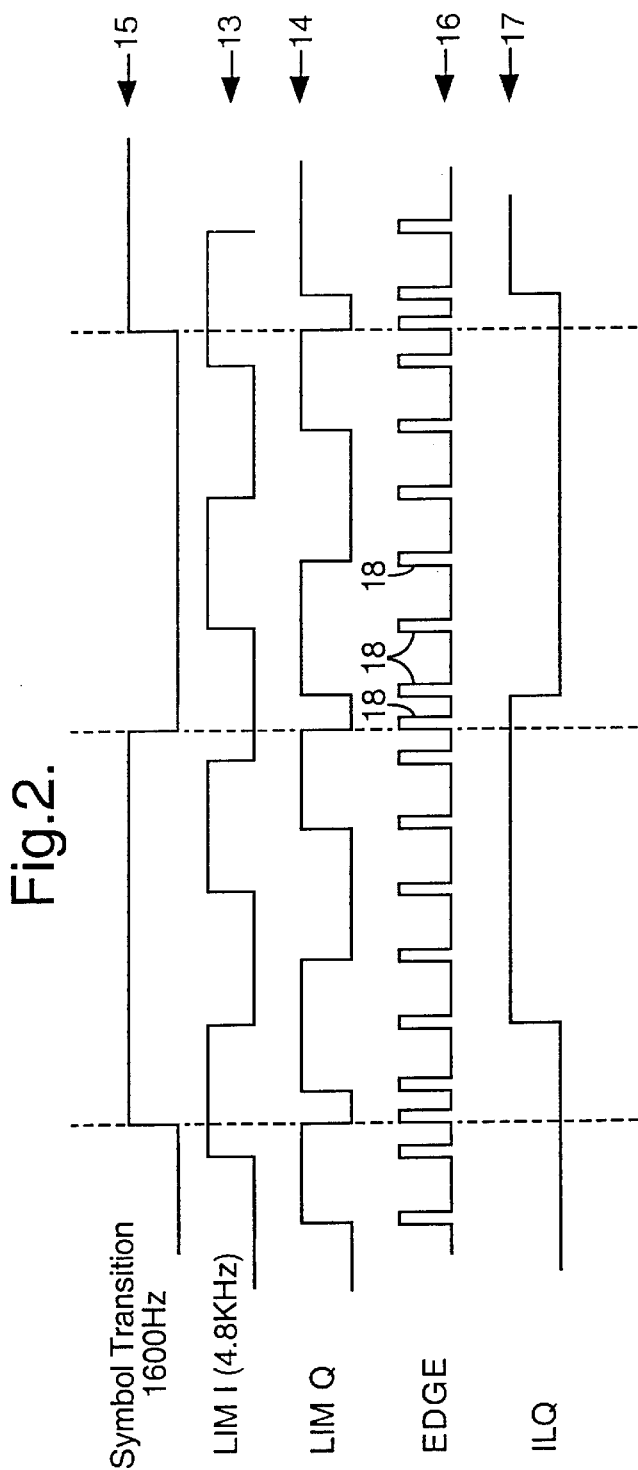
FIG. 2 shows a timing diagram illustrating the operation of a part of the demodulator of FIG. 1, and FIGS. 3 to 5 show in block diagram form other parts of the demodulator of FIG. 1.

Referring now to FIG. 2, the LIMI and LIMQ signals 13 and 14 provided by the receiver R in response to an RF signal having the symbol period of a signal 15 are processed by the edge detector 2 to provide the EDGE signal 16 and the ILQ signal 17. The edge detector 2 contains logic circuits to provide a short pulse 18 in its output EDGE signal 16 when any edge is detected on either of the LIMI and LIMQ signals 13 and 14, thereby providing indication of the deviation rate of the received signal. The deviation rate will be understood to be the frequency difference between the received signal 1 and a nominal centre frequency. In a four-level FSK paging system, the possible deviations may be −4800 Hz, −1600 Hz, +1600 Hz or +4800 Hz, i.e. there are two different directions and two different deviation rates.

The ILQ signal 17, generated by logic circuits in the edge detector 2, is dependent on which of the quadrature signals LIMI 13 and LIMQ 14 has the leading phase. Thus, the edge detector 2 determines both the frequency and the relative phase of the signals provided by the limited output direct conversion receiver R without the use of analogue to digital conversion circuitry. The signals 16 and 17 generated by the edge detector 2 are provided to the filter 3, which will now be described with reference to FIG. 3.

Figure 3:
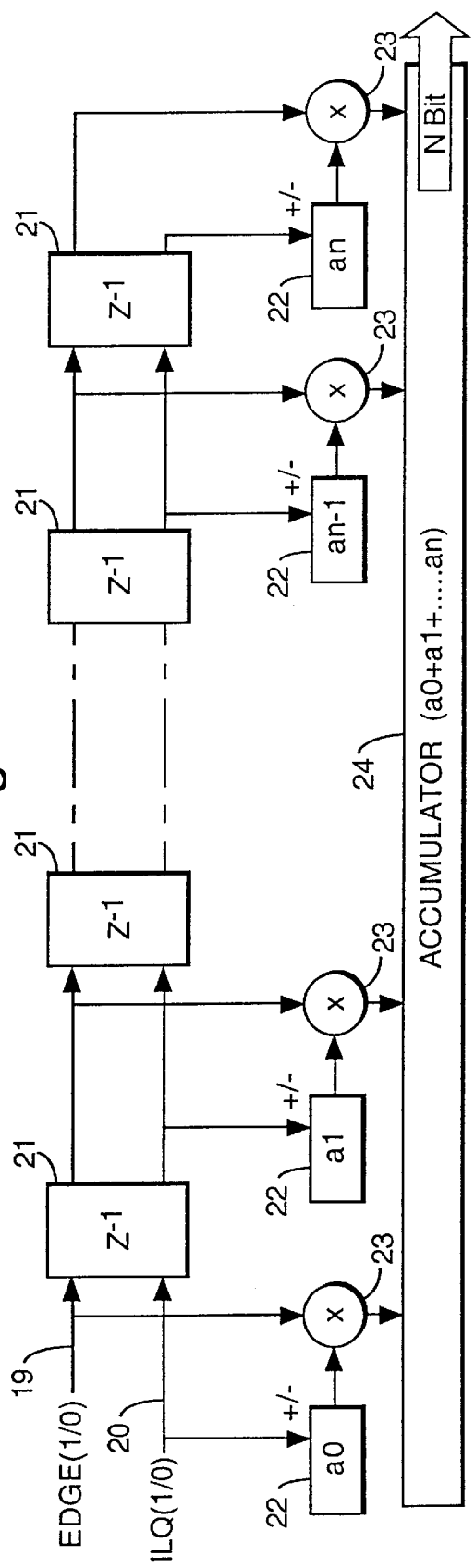

In FIG. 3, both the EDGE signal 16 and the ILQ signal 17, applied to respective ones of input leads 19 and 20 are cascaded through a series of filter segments, each comprising a D-type flip-flop device 21, a coefficient store 22 and a multiplier 23. The filter, which defines the bandwidth of the demodulator 1, comprises thirty-two cascaded segments which are clocked by a 200 kHz clock signal derived from the receiver crystal oscillator (not shown). The coefficient stores 22 contain 4-bit values which are calculated to provide the filter 3 with the characteristics of a 2 kHz raised cosine filter. Software to calculate appropriate coefficient values is available off-the-shelf. An accumulator 24 sums the values provided by the multiplier 23 of each stage, as enabled by its respective EDGE signal 16, to provide a twelve-bit filter output signal on the path 4.

Thus, the combination of the edge detector 2 and the filter 3 performs the same function as a frequency discriminator, and the filter 3 provides an output signal on the path 4 from which frequency control information can be derived. This is described in more detail below.

Figure 4:
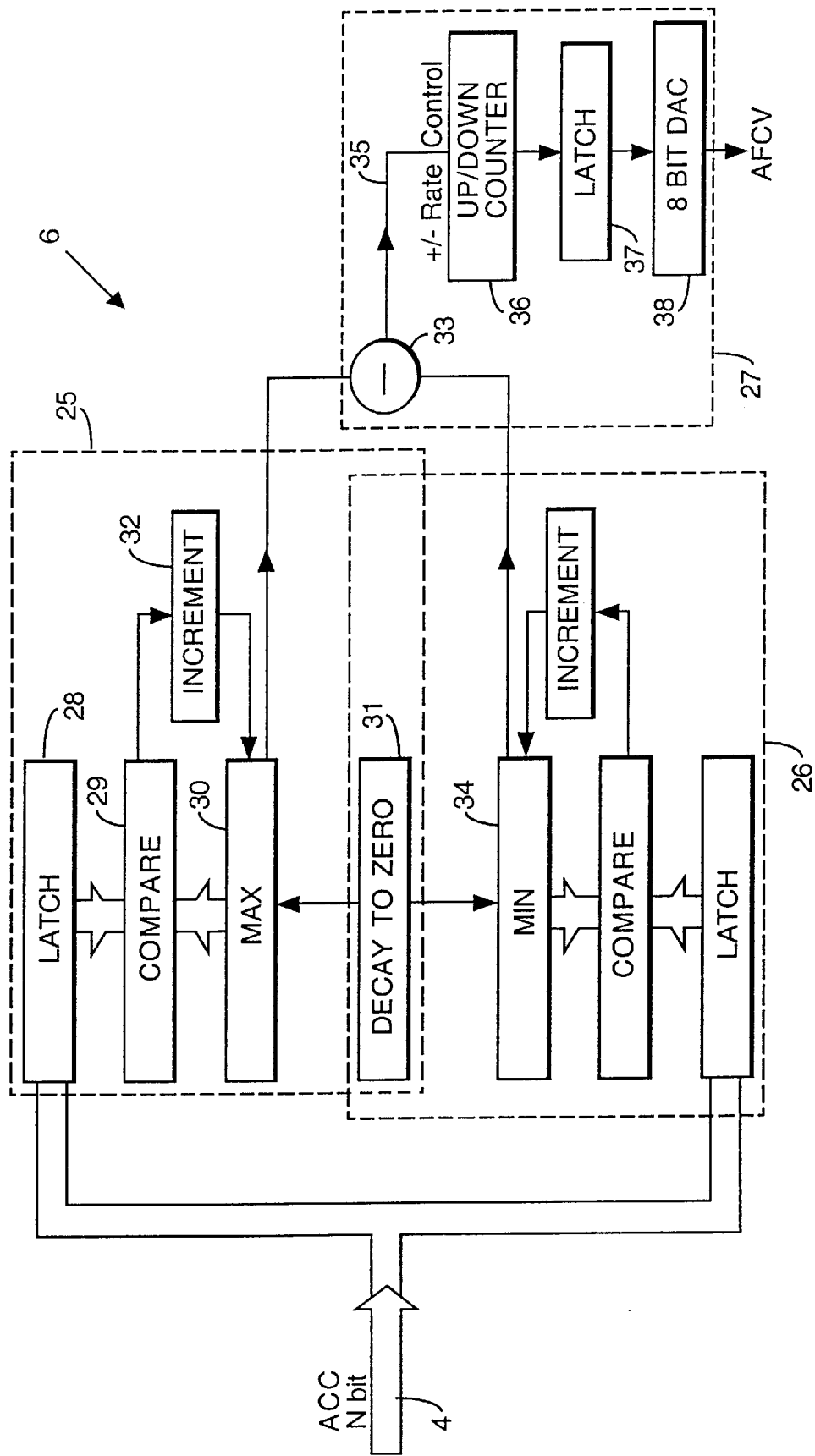

Referring now to FIG. 4, the AFC device 6 comprises generally a MAX level detector 25, a MIN level detector 26 and an AFC signal generator 27.

The MAX level detector comprises an N-bit data latch 28, a compare device 29, a MAX register 30, a decay-to-zero device 31 and an increment device 32. Operation is as follows. During initialisation, an arbitrary value is loaded into the MAX register 30. Incoming signals from the FIR filter 3 on the N-bit path 4 are clocked into the data latch 28 by a signal derived from the system clock signal. The value stored in the MAX register 30 is compared with the value stored in the data latch 28 by the compare device 29 which provides an output signal to the increment device 32 if the MAX register value is the lower. The increment device 32, on receiving such a signal, increments the value in the MAX register 30. Thus, the value in the MAX register 30 would after a period of time, equal or nearly equal the maximum level of signal provided by the FIR filter 3. The decay-to-zero device 32 operates to decrement the value in the MAX register 30, for example, every ten operations of the compare device 29. In this way, the value in the MAX register 30 will stay close to the maximum value provided on the path 4.

The MIN level detector 26 operates in substantially the same way as the MAX level detector 25 described above, except that the value on the path 4 is dealt with in opposite sense, to maintain an appropriate MIN value.

A subtracter 33 in the AFC signal generator 27 operates to detect, from the values in the MAX register 30 and a MIN register 34; in what direction the centre frequency deviates, if at all, from the nominal centre frequency. This is possible because the DC component of the filter output signal is related directly to this frequency deviation. The subtracter 33 calculates the mean of the MAX and MIN register values, and detects whether this is greater than or less than zero, indicative of whether the deviation frequency is respectively positive or negative in direction.

A signal provided on a line 35 is used by a counter 36 to increment or decrement appropriately a value stored therein. This counter value is provided as an analogue local oscillator control voltage signal AFC by way of a latch 37 and a digital to analogue converter (DAC) 38.

Figure 5:
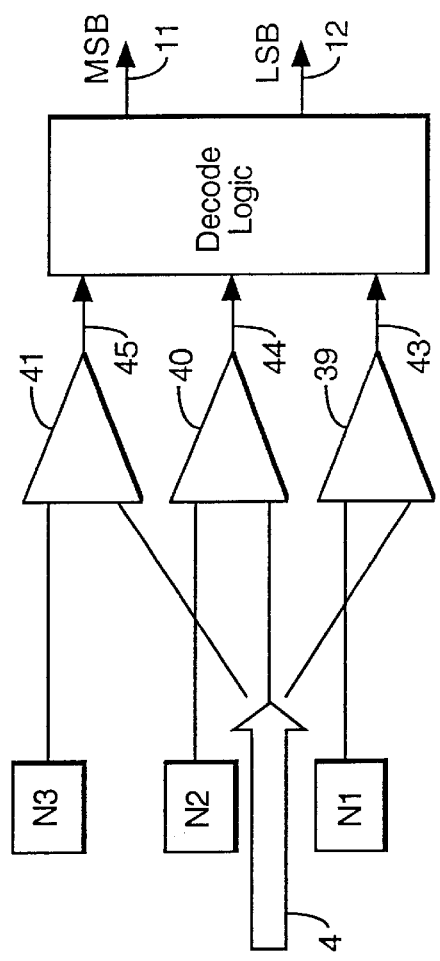

Referring now to FIG. 5, the data slicer 5 comprises three digital comparators 39, 40, 41 and a decode logic unit 42. The comparators 39–41 compare digital values from respective threshold registers N1, N2 and N3 with the value present on the path 4 on every cycle of a 50 kHz clock signal.

The values held in the threshold registers N1, N2 and N3 are derived from the MAX and MIN values stored in the registers 30, 34 of the AFC device 6 of FIG. 4. Typically, the N1 value is equal to the MIN value plus one sixth of the difference between the MAX and MIN values, the N3 value is equal to the MAX value minus one sixth of the difference between the MAX and MIN values, and the N2 value is equal to the mean of the MAX and MIN values.

The comparators 39–41 operate to provide an output signal on their respective output line 43–45 when the value on the path 4 exceeds the value in their respective threshold register N1, N2, N3. In this way, the decode logic device 42 need only comprise simple logic to provide signals on the output leads 11 and 12 which correspond to the demodulated data. As the decode logic device 42 is also clocked at 50 kHz suitable circuitry may need to be used to associate the MSB and LSB output signals with the symbol period.

Although the embodiment has been described for use with a limited output direct conversion receiver, the present invention is equally applicable for use with direct conversion receivers having analogue outputs, although crossover detection circuitry should be used to interface such receivers to the edge detector, or the edge detector logic incorporate such crossover detection circuitry.

Also, the invention has been described as having an edge detector 2 wherein the ILQ signal is generated in the logic circuits used to generate the EDGE signal. Separate logic circuits to generate an ILQ signal and an EDGE signal from a receiver I and Q outputs could be used.

What is claimed is:

1. A frequency shift key (FSK) demodulator for demodulating I and Q output signals provided by a direct conversion receiver arrangement, comprising: apparatus responsive to the I and Q signals for providing a first signal dependent on a frequency of the I and Q signals, and a second signal dependent on a relative phase of the I and Q signals; and a finite impulse response filter for receiving the first and second signals, and for providing an output data signal representative of data carried by the I and Q signals.

2. The demodulator in accordance with claim 1; and further comprising a data slicer operatively connected to the filter, for providing the output data signal.

3. A demodulator arrangement for a direct conversion receiver responsive to four-level, frequency-shift keyed, received signals to provide limited phase-quadrature I and Q signals, the demodulator arrangement comprising: apparatus for providing a pulse output signal in response to each transition between levels in the I and Q signals; apparatus for providing a phase output signal indicative of a relative phase of the I and Q signals; a finite impulse response filter responsive to the pulse output signal and the phase output signal to provide a pulse-rate signal indicative of a frequency of the I and Q signals; and a decoder responsive to the pulse-rate signal and to the phase output signal to provide demodulated output signals.

* * * * *